March 24, 1936.   F. H. MARKWICK   2,035,082
GAUGE HOLDER
Filed March 21, 1934
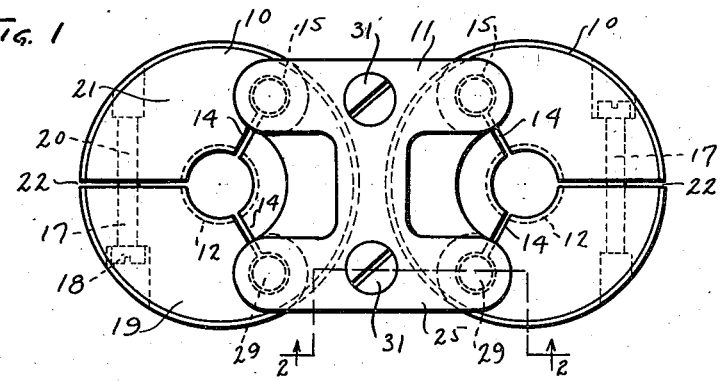
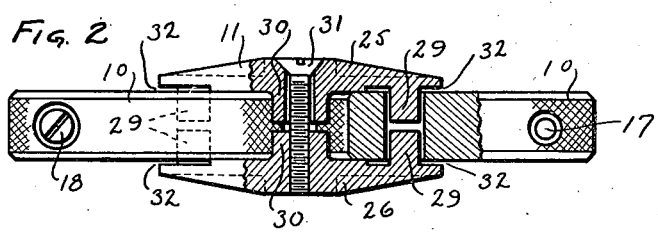
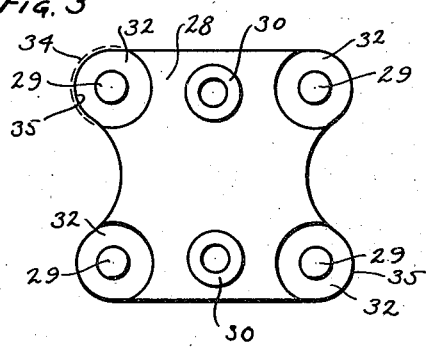
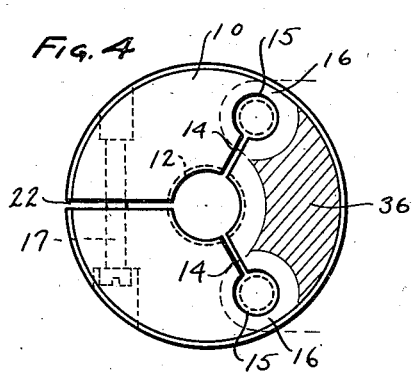
Inventor
Frederick H. Markwick
By Marechal & Noz
Attorney Patented Mar. 24, 1936

2,035,082

UNITED STATES PATENT OFFICE 2,035,082

GAUGE HOLDER

Frederick H. Markwick, Dayton, Ohio, assignor, by mesne assignments, to Sheffield Gage Corporation, Dayton, Ohio, a corporation of Ohio Application March 21, 1934, Serial No. 716,591

11 Claims. (Cl. 33—199)

This invention relates to gauges, and more particularly to holders for gauges of the character known as ring gauges.

One of the principal objects of the invention is the provision of a gauge assembly comprising a plurality of ring gauges and a holder therefor which is adapted to securely hold the ring gauges in assembled relationship for convenient usage, and in such a manner that distorting forces are not created in the gauges.

Another object of the invention is the provision of a ring gauge holder of simple construction comprising holding members which in assembly provide an interfitting connection between several ring gauges, and in addition afford a clamping action on the gauges within restricted areas of the gauges which can effectively withstand such action without deformation.

Other objects and advantages of the invention will be apparent from the following description, the accompanying drawing and the appended claims.

In the drawing, which discloses a preferred embodiment of the invention,—

Fig. 1 is a plan view of a gauge assembly incorporating the present invention;

Fig. 2 is a side view of Fig. 1; partly shown in section as indicated by the line 2—2 of Fig. 1;

Fig. 3 is a view of one of the holding members; and

Fig. 4 is a plan view of a ring gauge with portions of the gauge holder shown diagrammatically.

The drawing, in which like characters of reference designate like parts throughout the several views thereof, illustrates a gauge assembly comprising a pair of ring gauges 10, of well known form, which are held together in assembled relationship by provision of a gauge holder designated generally by the numeral 11. Ring gauges, such as those illustrated, have a wide usage in industry for segregating machine parts and the like, within predetermined size limits. The gauges may, for example, have a gauging opening formed as a cylindrical hole, or may have a screw thread formed therein as indicated at 12. Such gauges are used by entering the test piece within the gauge. The gauges are generally used in pairs which have a size difference corresponding to the size limits or tolerance in the pieces to be gauged. That is to say, one gauge of a pair will be of a size to gauge the maximum allowable size and the other gauge will be of a size to gauge the minimum allowable size. As there may be many of these gauges in use at one time, and as they all bear close general resemblance to one another, it is difficult to select a single desired gauge from a group of gauges except by close inspection. As the gauges are generally used in pairs as mentioned above, a holder for maintaining the gauges in related pairs not only prevents misplacement of one of a pair of gauges but it also affords a more convenient means of handling the gauges.

Gauges of this character are generally constructed so that they will have some limited adjustment. These gauges are usually made from a steel disk and, to permit of adjustment, the disks are slotted to afford some flexibility. As shown, the ring gauges 10 are provided with spring slots 14 which extend radially from the gauging opening 12, and which, at their outer ends, terminate in spring holes 15. There is a narrow section of metal 16 between the outer portion of each spring hole and the outer surface of the gauge which is sufficiently small in cross section as to permit some movement between the different parts of a gauge. The adjusted positioning is maintained by some form of locking means such, for example, as the screw 17 which has a head portion 18 in the gauge part 19 and has threaded engagement at 20 in the gauge part 21. The slot 22 between these gauge parts permits the required adjusting movement.

The holding device for the ring gauges is of such character that they may be securely held in assembled relationship without creating any distorting forces which would tend to deform the adjusted setting of the gauges. To accomplish such assembly the holding means is arranged so that it will loosely interfit the gauges and will in addition have a clamping action which is restricted to a gauge area that can effectively withstand such action without setting up any strains in the gauges. As shown, the holding means comprises a pair of plates which are generally of like form and which are adapted to hold two ring gauges, although obviously the invention should not be restricted to a means for holding only two such gauges. In the illustrated embodiment of the invention the two holder parts differ from one another only in that one, indicated at 25, has a clearance hole to receive a flat head machine screw and the other part, indicated at 26, has a threaded hole for engagement with the screw. The holder parts are preferably made as castings and comprise a plate like portion 28 which is substantially rectangular in form, and which has at each corner a stud projection 29. Additional bosses 30 serve to receive the screws 31 by which the gauge assembly is held together. The studs 29 and bosses 30 are somewhat shorter than one-half the thickness of the gauges of the assembly so that these parts do not meet when the holder is in assembled position.

The holder projections 29 are spaced according to the spring holes 15 of the gauges with which the holder is to be used. The projections 29 are of somewhat smaller diameter than the spring holes so that they are received loosely therein. In order to obtain a proper interfitting relationship between the studs 29 and spring holes 15 the studs are machined to a proper spacing. A simple means of finishing the stud projections is through the use of a hollow end mill which will reduce the stud to a desired diameter and, in the same operation, will provide a recess 32 on the face of the plate portion 28. As shown in Fig. 3, an end mill has been used which cuts to a sufficient diameter, as indicated at 34, to relieve all of the plate surface adjacent each corner 35 of the plate. The remaining untouched surface is restricted to a contact area which is less than the space between adjacently related spring slots and holes of the gauges. In Fig. 4 the contacting area of the holder plates is indicated by the shaded portion 36 and, as is apparent from the drawing, this contact area is restricted so that there can be no application of clamping pressure beyond the interengaged holes and related slots. The clearance spots adjacent the projections 29 are clearly shown in Figs. 2 and 3, and are indicated by the numeral 32.

In gauges of this character one size of gauge blank may be finished to a desired gauging opening within the limits of the gauge blank. As an example, the illustrated size of gauge blank may be finished to provide a gauge opening of any size between a $\frac{9}{16}''$ diameter minimum and a $\frac{3}{4}''$ diameter maximum. Different gauge holders are provided for each diameter of gauge blank, but a single size of gauge holder will serve to hold any gauges of like blank size. As the gauge assembly is maintained only through the use of the holding screws 31 the holder may be readily attached to any desired pair of gauges of the proper spring hole spacing.

The gauge holder is preferably constructed of some light weight material such as a suitable aluminum alloy and, as the holder is quite small as compared to the gauges, it adds but little to the weight of the assembled gauges. By assembling the gauges in the manner illustrated they are rendered more convenient to hold when in use as the gauge holder and gauge not in use serve, in effect, as a handle whereby the gauge to be used may be conveniently grasped.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauge assembly comprising a plurality of ring gauges of the form having spaced pairs of spring slots and holes, means for holding said gauges in assembled relationship, said holding means having clamping arms for each gauge for clamping opposite sides of each of said gauges and effective only within the area bounded by an adjacently related pair of spring slots and holes, and means on the holding means loosely interfitting the gauges at the holes adjacent the clamped area.

2. A gauge assembly comprising a plurality of ring gauges of the form having spaced pairs of spring slots and holes, and means for holding said gauges in co-planar relationship, said holding means comprising spaced studs interengaging a pair of spring holes in each gauge and a clamping surface affording a clamping engagement with each of said gauges effective on the gauges only intermediate the interengaged spring holes and associated slots.

3. A gauge assembly comprising a plurality of ring gauges of the form having spaced pairs of spring slots and holes, and means for holding feed gauges in co-planar relationship, said holding means comprising a plate having pairs of projections engageable with adjacently related pairs of spring holes in each gauge, a portion intermediate the projection of each pair affording a surface contact with each gauge, a member adapted to contact each gauge on the side opposite the plate and within the limits of the interengaged pairs of spring holes and associated slots, and means for urging said plate and member toward one another for clamping engagement of the gauges.

4. A gauge assembly comprising a plurality of ring gauges of the form having spaced pairs of spring slots and holes, and means for holding said gauges in co-planar relationship comprising a pair of plates of like shape each having related pairs of projections engageable with adjacently related pairs of spring holes in each gauge, a portion spaced from and intermediate the projections of each pair affording a surface contact with each gauge, and means for clamping said plates in engagement with the gauges.

5. A holding device for ring gauges of the form having spaced spring slots and holes, said holding device comprising a plate having projections spaced corresponding to adjacently related gauge spring holes and loosely receivable therein and having an intermediate surface area adapted to engage the gauge in surface contact, a member engageable with the opposite surface of the gauge, and means for holding said member and plate in clamped engagement with the gauge.

6. A holding device for ring gauges of the form having spaced spring slots and holes, said holding device comprising a pair of members having axially related studs spaced according to the spacing of adjacently related gauge spring holes and loosely receivable therein and having surface areas intermediate and spaced from the studs for surface contact with a gauge, and means for holding the members in clamping engagement with a gauge.

7. A holding device for ring gauges of the form having spaced spring slots and holes, said holding device comprising a plate having a gauge contacting surface, projections extending from said surface and spaced for loose reception within an adjacently related pair of gauge spring holes, said plate having a recess surrounding each projection to terminate the contacting surface at a distance from the projections.

8. A holding device for ring gauges of the form having spaced spring slots and holes, said holding device comprising a pair of like shaped plates substantially rectangular in form and having a gauge engaging surface, projections extending from each plate surface adjacent each corner of the plate for reception in pairs within adjacently related gauge spring holes, said plate being depressed adjacent each corner to afford a recess surrounding the projections and clearance area between the projections and the plate surface, and means for holding said plates in clamped engagement on opposite sides of a pair of ring gauges.

9. A gauge assembly comprising a plurality of ring gauges each having relatively adjustable sections, holding means for clamping the gauges in assembled relationship comprising relatively movable clamping arms for clamping opposite faces of each gauge, said holding means and gages having cooperating portions limiting clamping engagement to only one of said sections of each gauge.

10. A gauge assembly comprising a plurality of ring gauges of the form having angularly related spring slots providing adjacently related gauge sections, holding means for clamping said gauges in assembled relationship, said holding means having relatively movable clamping arms for each gauge engageable on opposite sides thereof, said arms and a gauge section of each gauge having cooperating clamping portions limiting clamping engagement to only one of said sections of each gauge.

11. A gauge assembly comprising a plurality of ring gauges having relatively adjustable segmental sections, and holding means for clamping the gauges in assembled relationship, said holding means having relatively movable clamping arms for each gauge engageable with opposite gauge faces, said clamping arms and a gauge section having means including a recess and a cooperating projection limiting engagement of the holding means and a gauge to a predetermined position in which clamping engagement is limited to only one of said sections of each gauge.

FREDERICK H. MARKWICK.